United States Patent [19]

Travis

[11] Patent Number: 5,765,180

[45] Date of Patent: *Jun. 9, 1998

[54] METHOD AND SYSTEM FOR CORRECTING THE SPELLING OF MISSPELLED WORDS

[75] Inventor: Paul A. Travis, Kirkland, Wash.

[73] Assignee: Microsoft Corporation, Redmond, Wash.

[ * ] Notice: The term of this patent shall not extend beyond the expiration date of Pat. No. 5,604,897.

[21] Appl. No.: 725,559

[22] Filed: Oct. 3, 1996

Related U.S. Application Data

[63] Continuation of Ser. No. 525,405, May 18, 1990, Pat. No. 5,604,897.

[51] Int. Cl.$^6$ ............................................. G06F 7/04
[52] U.S. Cl. ............................................. 707/533
[58] Field of Search .................. 395/794, 795; 707/533

[56] References Cited

U.S. PATENT DOCUMENTS

| | | | |
|---|---|---|---|
| 3,259,883 | 7/1966 | Rabinow et al. | 382/310 |
| 3,850,279 | 11/1974 | Kolpek | 400/76 |
| 3,969,698 | 7/1976 | Bollinger et al. | 382/310 |
| 4,010,445 | 3/1977 | Hoshino | 382/310 |
| 4,136,395 | 1/1979 | Kolpek et al. | 382/311 |
| 4,498,148 | 2/1985 | Glickman | 707/533 |
| 4,650,349 | 3/1987 | Westrich | 400/98 |
| 4,689,768 | 8/1987 | Heard | 400/63 |
| 4,787,059 | 11/1988 | Yoshimura | 707/533 |
| 4,797,855 | 1/1989 | Duncan, IV et al. | 400/63 |
| 4,818,131 | 4/1989 | Sakai | 400/63 |
| 4,847,766 | 7/1989 | McRae et al. | 400/63 |
| 4,859,091 | 8/1989 | Ueda | 707/533 |
| 4,903,206 | 2/1990 | Itoh et al. | 707/533 |
| 5,189,610 | 2/1993 | Kaplan et al. | 707/533 |
| 5,218,536 | 6/1993 | McWherter | 707/533 |
| 5,258,909 | 11/1993 | Damerau et al. | 707/533 |
| 5,380,105 | 1/1995 | Shimada et al. | 707/533 |

*Primary Examiner*—James P. Trammell
*Assistant Examiner*—John Q. Chavis
*Attorney, Agent, or Firm*—Jones & Askew, LLP

[57] ABSTRACT

The present invention provides a method and system for correcting the spelling of words. In a preferred embodiment, a list of misspelled words and associated correctly spelled words is maintained. When a misspelled word is encountered during the spell checking of a word processing document, the system searches the list for the misspelled word. If the misspelled word is in the list, the system replaces the word in the document with the associated correctly spelled word. The system also provides a method and system for adding misspelled words and associated correctly spelled words to the list.

20 Claims, 3 Drawing Sheets

Corrected Before File Format

Teh -> the ↵ supercede -> supersede ↵ mispelling -> misspelling ↵

METHOD AND SYSTEM FOR CORRECTING THE SPELLING OF MISSPELLED WORDS

CROSS-REFERENCE TO RELATED APPLICATION

This application is a Continuation of U.S. Pat. application Ser. No. 07/525,405, filed May 18, 1990, allowed on Feb. 18, 1997, now U.S. Pat. No. 5,604,897.

TECHNICAL FIELD

This invention relates generally to computer word processing systems and particularly to a method and system for remembering and correcting misspelled words.

BACKGROUND OF THE INVENTION

A primary use of computers, especially personal computers, is "word processing." Word processors have replaced the typewriter as a principal means for document production. A word processor allows a user to input the text of a document, such as a letter, into a computer. Once the document is in the computer the user can make revisions to it. For example, paragraphs can be easily moved around, misspelled words can be corrected, and words can be deleted. Finally, the document can be printed out or can be stored in the computer for retrieval and updating at a later date. One such word processor is Microsoft Corporation's WORD.

In producing documents, it is typically very important that each word in the document be spelled correctly. In manual word processing systems (e.g., the typewriter), the only way to check the spelling is to manually review the document after it is typed. In computer word processors, a spell checking program (spell checker) is often used to check the spelling of the words in a document. A spell checker has an associated dictionary file that contains a list of correctly spelled words. To check the spelling of a word in the document, the spell checker searches the dictionary for that word. If the word is in the dictionary, then the word is correctly spelled. Otherwise, the word is misspelled. (Since a dictionary will not contain every possible word, e.g., last names, it may be that the word is correctly spelled but not in the dictionary.) The spell checker typically reports the misspelling to the user and prompts for the correct spelling. The spell checker then replaces the misspelled word with the correctly spelled word.

The typical spell checker also allows the user to add words to the dictionary. For example, the dictionary may not include terms that are used in specialized fields, such as medicine or law.

A common problem in the entry of words occurs when a word is consistently misspelled in the same way. For example, the user may type "teh" rather than "the." Or the user may type "supercede" rather than "supersede." A typical spell checker will detect each misspelling and give the user a chance to correct it. However, the next time the user misspells in the same way, he must reenter the correct spelling. This continual need for correction is undesirable. It would be desirable to have a spell checker in which these misspellings could be automatically corrected.

SUMMARY OF THE INVENTION

It is an object of the present invention to provide an improved spell checker for a word processing system or the like in which commonly misspelled words are automatically corrected.

It is another object of the present invention to provide an improved spell checker for a word processing system or the like in which the user can designate common misspellings and associated correct spellings.

These and other objects of the present invention, which will become more apparent as the invention is described more fully below, are obtained by providing an improved method and system for correcting the spelling of words in a document. In a preferred embodiment, a word processing system maintains a "corrected before" file, which contains a list of misspelled words and associated correctly spelled words. The system provides for retrieving a misspelled word from the word processing document, determining whether the retrieved misspelled word is in the corrected before file as a misspelled word, and if the retrieved misspelled word is in the corrected before file, retrieving the associated correctly spelled word from the corrected before file and automatically replacing the misspelled word in the document with the retrieved associated correctly spelled word to effect the correction of the spelling.

In a preferred embodiment of the present invention, a word processing system provides a system for inputting a correctly spelled word from a user and storing the corresponding misspelled word and the correctly spelled word in the corrected before file.

DETAILED DESCRIPTION OF THE INVENTION

The present invention provides a method and system for correcting the spelling of misspelled words in a computer system. In a preferred embodiment, the present invention is part of a spell checking program, which may itself be part of a word processor. A file that contains a list of misspelled words and associated correctly spelled words is known as the "corrected before" file. When the spell checker encounters a misspelled word during the spell checking of a document, the system searches the corrected before file for the misspelled word. If found, the system, in a preferred embodiment, automatically replaces the misspelled word in the document with the correctly spelled word. A preferred embodiment also allows the user of the spell checker to add misspelled words and associated correctly spelled words to the corrected before file.

Figure 1:
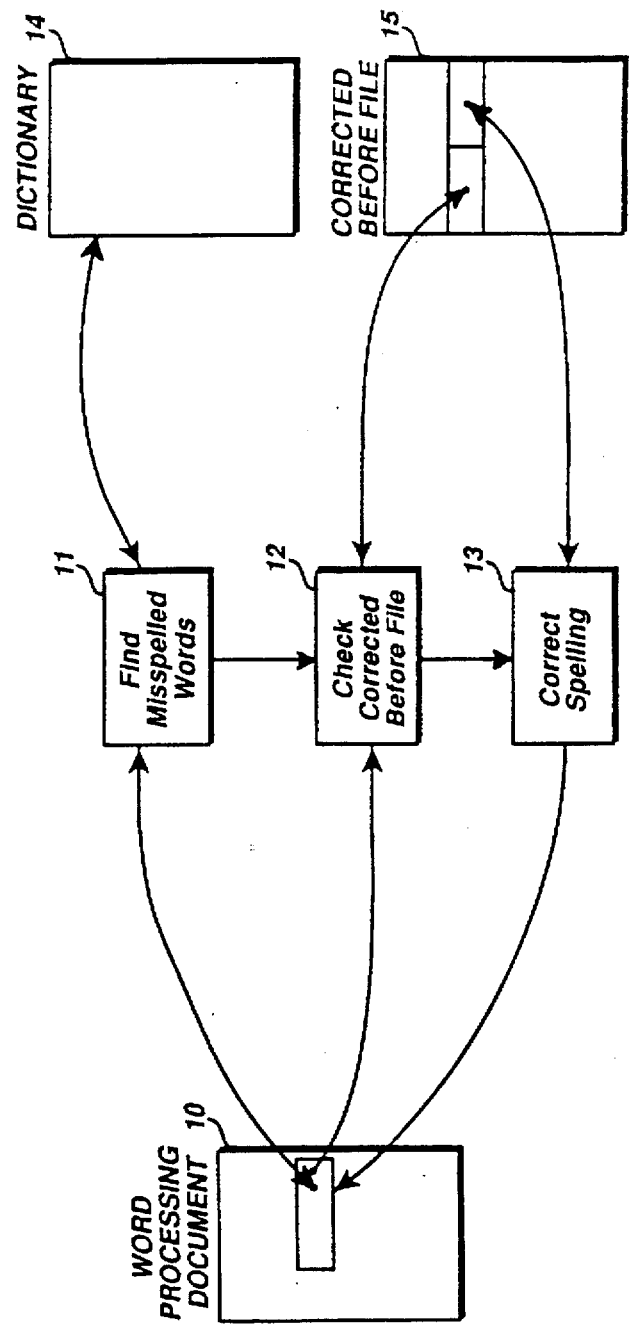
FIG. 1 is a block diagram which illustrates the processing units of a preferred embodiment of the present invention.

FIG. 1 is a block diagram which illustrates the processing units of a preferred embodiment of the present invention. The word processing document 10, the dictionary file 14, and the corrected before file 15 reside in computer memory during spell checking. The word processing document 10 contains a list of words. A word can be defined as a string of characters delimited by a blank or a punctuation mark. In a preferred embodiment, the characters are stored in American Standard Code for Information Interchange (ASCII) format. The dictionary file 14 also contains a list of words. Any of the well-known dictionary storage and access techniques can be used with the present invention. The corrected before file 15 contains a list of misspelled words and the associated correctly spelled words. In a preferred embodiment, each pair of misspelled and associated correctly spelled words is delimited by an end of line character.

The processing units 11, 12, 13 use the word processing document 10, the dictionary file 14, and the corrected before file 15 as input to correct the spelling of words that are misspelled with a consistent misspelling. The find misspelled word unit 11 successively fetches words from the word processing document 10. The find misspelled word unit 11 then reads the dictionary file 14 to determine if the word is in the dictionary. If the word is not in the dictionary, then it is assumed to be misspelled. If the word is misspelled, then a pointer to the misspelled word is passed to the check corrected before file unit 12.

The check corrected before file unit 12 receives the pointer to the misspelled word from the find misspelled word unit 11. The check corrected before file unit 12 reads the corrected before file 15 to determine if the file contains the misspelled word. If the misspelled word is in the corrected before file 15, then the check corrected before file unit 12 sends a pointer to the misspelled word in the word processing document 10 and a pointer to the associated correctly spelled word to the correct spelling unit 13.

The correct spelling unit 13 receives the pointers and replaces the misspelled word in the word processing document 10 with the correctly spelled word to complete the correction.

Figure 2:
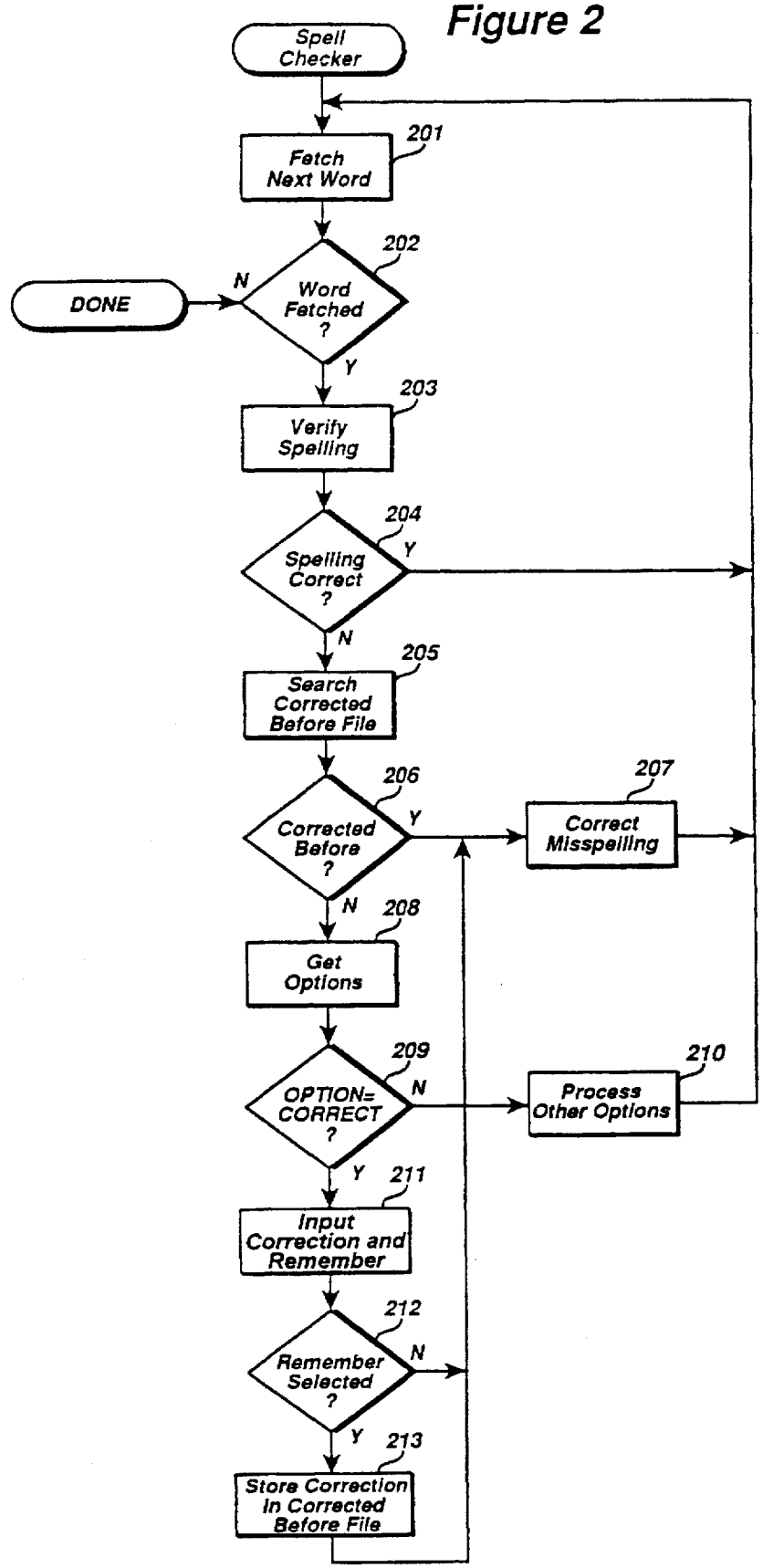
FIG. 2 is a flow diagram of spell checker program that implements a preferred embodiment of the present invention.

FIG. 2 is a flow diagram of a spell checker program that implements a preferred embodiment of the present invention. The input to the spell checker is a document to be checked, a dictionary file, a corrected before file, a correctly spelled word from the user, and an indicator whether the correctly spelled word should be stored in the corrected before file. The spell checker fetches each word from the document or from a portion of the document until all the words have been processed. For each word fetched, the spell checker determines if the word is in the dictionary. If the word is in the dictionary, then the spell checker fetches the next word. If the word is not in the dictionary, the spell checker determines if the word is in the corrected before file as a misspelled word. If the word is in the corrected before file, the spell checker replaces the misspelled word in the document with the correct spelling and fetches the next word. If the word is not in the corrected before file, the spell checker prompts the user for the correct spelling and asks whether the correction should be stored in the corrected before file. If the user indicates that the correction should be stored, then the spell checker stores the misspelled word and the correctly spelled word into the file. Then the spell checker corrects the misspelling in the document and fetches the next word.

In block 201, the spell checker fetches the next word from the document. In block 202, if all the words in the document have already been fetched, then the spell checking is done, else the spell checker continues at block 203. In block 203, the spell checker determines whether the fetched word is in the dictionary. The techniques for storing a dictionary and determining whether a word is in the dictionary are well known. In block 204, if the fetched word is in the dictionary, then the spelling is correct and the spell checker loops to block 201 to fetch the next word, else the spell checker continues at block 205. In block 205, the spell checker searches the corrected before file to determine whether the fetched word is in the file as a misspelled word, and retrieves the associated correctly spelled word. In block 206, if the fetched word is in the corrected before file as a misspelled word, then the spell checker continues at block 207, else the spell checker continues at block 208.

In block 207, the spell checker replaces the misspelled word in the document with the correctly spelled word and loops to block 201 to fetch the next word.

In block 208, the spell checker displays the misspelled word to the user and prompts the user with a list of options, such as, to correct the spelling, to assume the spelling is correct, or to add the spelling to the dictionary. In many existing systems, the user is presented with a list of possible correct spellings from the dictionary file that the user may select to replace the misspelled word. In block 209, if the user selects the option to correct the misspelled word, then the spell checker continues at block 211, else the spell checker continues at block 210. In block 210, the spell checker processes the other options and loops to block 201 to fetch the next word.

In block 211, the spell checker prompts the user to input the correct spelling for the fetched word and to indicate whether the correction should be added to the corrected before file. In block 212, if the user indicates that the correction should not be added to the corrected before file, then the spell checker continues at block 207 to correct the misspelling, else in block 213 the spell checker adds the fetched word and the correctly spelled word to the corrected before file and continues at block 207 to correct the misspelling. In a preferred embodiment, the fetched word and correctly spelled word pair is appended to the end of the corrected before file.

Figures 3, 4:
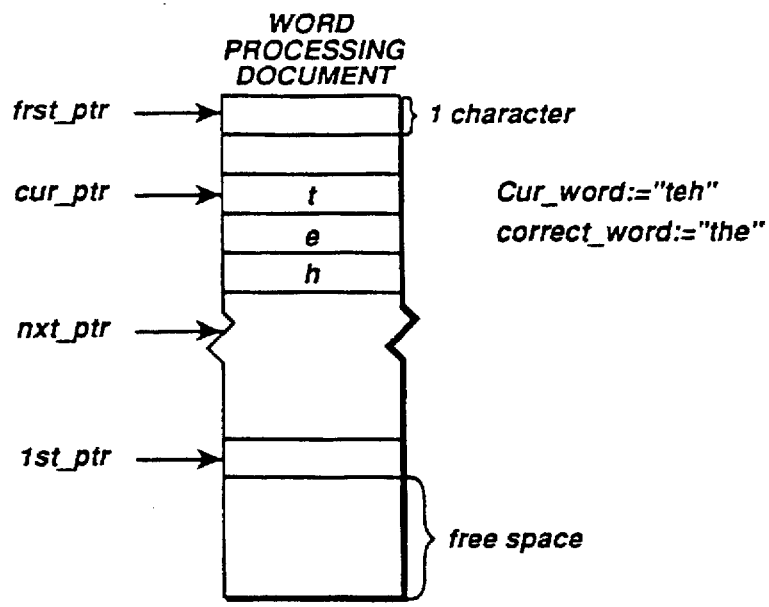
FIG. 3 shows variables used in the pseudo code of Table 1.
FIG. 4 shows the format of the corrected before file in a preferred embodiment of the present invention.

Table 1 is Pascal-like pseudo code illustrating an embodiment of the present invention. The main procedure, named "Proof," spell checks a document. FIG. 3 shows the variables used in procedure Proof. The input parameters are frst_ptr and lst_ptr, which point to the first and last character in the document, respectively. Procedure Proof updates the variable lst_ptr to accommodate differences in the length of a misspelled word and the associated correctly spelled word. The variables cur_ptr and nxt_ptr point to the word being spell checked and to the character after that word, respectively. The string variables cur_word and correct_word contain the word being spell checked and the correctly spelled word, respectively. In the pseudo code, the string type is an array of characters that can be of variable length. The function named "length" returns the number of characters in a string.

Referring now to the pseudo code for procedure Proof, the while loop, which controls the processing, terminates when cur_ptr is greater than lst_ptr, that is, when all the characters have been processed. The variable cur_ptr points to the character in the document being processed. Procedure FetchNextWord inputs cur_ptr, determines the next word in the document, returns the word in cur_word, and updates cur_ptr. Procedure Proof then sets nxt_ptr to the next character in the document after the current word. Procedure Proof then invokes function Verif with parameter cur_word. Function Verif determines whether the word is in the dictionary. If the word is in the dictionary, then function Verif returns a value of true, else it returns a value of false. If the word is in the dictionary, then procedure Proof updates cur_ptr to point to the next character and loops to the beginning of the while loop.

If the word is not in the dictionary, then procedure Proof invokes function Search_CBF. Function Search_CBF determines whether the passed word is in the corrected before file. If the word is in the file, then function Search_CBF returns with a value of true and the correct spelling in variable correct_word. If the word is in the file, then procedure Proof replaces the incorrect spelling in the document with the correct spelling by invoking procedure CorrectMisspelling, updates cur_ptr to point to the next character, and loops to the beginning of the while loop.

If the word is not in the corrected before file, then procedure Proof invokes procedure GetOption. In a preferred embodiment, the options include "correct," "add," and "ignore." Where "correct" means to correct the spelling, "add" means to add the word to the dictionary, and "ignore" means to assume the spelling is correct. The pseudo code shows the processing for the "correct" option. Procedure Proof invokes procedure InputCorrection. Procedure InputCorrection displays the incorrectly spelled word, prompts the user to input the correct spelling, and asks the user whether to save the correction in the corrected before file. If the user indicates that the correction is to be saved, then procedure Proof invokes procedure AddTo_CBF to store the incorrect and correct spelling into the corrected before file. FIG. 4 shows the format of a preferred embodiment of the corrected before file. Procedure Proof then invokes procedure CorrectMisspelling to replace the incorrect spelling in the document. The procedure then adjusts the variable nxt_ptr to account for the length of the correctly spelled word, sets cur_ptr, and loops to the beginning of the while loop.

Procedure FetchNextWord starts at cur_ptr and searches for the next word and returns it in cur_word. The variable cur_ptr is set to point to the first character of the word. The procedure first searches for a non-delimiting character, which indicates the start of a word. The procedure then stores the following characters into cur_word until a delimiter or the end of document is encountered.

The function Search_CBF searches the corrected before file for the incorrectly spelled cur_word. If cur_word is in the file, function Search_CBF returns a value of true, else it returns a value of false. Each entry in the file is in the format containing the following: incorrect spelling, "→", correct spelling, and end of line character. Function Search_CBF inputs a line at a time and invokes procedure Parse to retrieve the incorrect and correct spelling. Although the pseudo code indicates that the function opens and closes the corrected before file each time it is invoked, one skilled in the art would know of programming techniques for obviating an open and a close on each invocation.

Procedure AddTo_CBF adds a record to the corrected before file.

Procedure CorrectMisspelling replaces the misspelled word in the document with the correctly spelled word. The procedure adjusts the variable 1st_ptr to account for a difference in length of incorrectly spelled word and correctly speled word, which changes the length of a document. If the spellings have different lengths, then the document size is adjusted and the characters in the document after the correction must be moved. The procedure then inserts the correction.

TABLE 1

```
PROCEDURE Proof(first_ptr : ^CHAR, VAR 1st_tr : ^CHAR);
TYPE
STRING = ARRAY [1..n] OF CHAR;
{a variable length array}
VAR
```

TABLE 1-continued

```
cur_ptr, nxt_ptr : A CHAR
cur_word, correct_word : STRING;
save_flag : BOOLEAN;
PROCEDURE FetchNextword
(VAR cur_ptr : ^CHAR,
VAR cur_word : STRING);
VAR
ptr : ^CHAR;
BEGIN
WHILE ((cur_ptr^in [" ",".",",",";", ... ]) {delimiters}
AND cur_ptr <=1st_ptr) DO
cur_ptr :=cur_ptr + 1;
cur_word :=null_string;
ptr :=cur_ptr;
WHILE (NOT(ptr^ in [" ",".",",",";", ... ])
AND ptr <= 1st_ptr) DO
BEGIN
cur_word :=Concat(cur_word, ptr^)
ptr := ptr + 1;
END;
END; {FetchNextword}
FUNCTION Search_CBF
(cur_word : STRING,
VAR correct_word : STRING) : BOOLEAN;
VAR
match: BOOLEAN;
line, bad_word, good_word : STRING;
(remove page eject)
PROCEDURE Parse;
BEGIN
i := 1; bad := true;
good_word :=null_string; bad_word :=null_string;
WHILE (line[i]<>eol_char) DO
BEGIN
IF (bad) THEN
IF (line[i] = blank_char) THEN
BEGIN
i := i + 3; {skip over "->"}
bad := false;
END;
ELSE
bad_word := Concat(bad_word, line[i]);
ELSE
good_word := Concat(good_word, line[i]);
i := i + 1;
END;
END; {Parse}
BEGIN
open ("CBF");
match := false;
WHILE (NOT eof("CBF") AND NOT match) DO
BEGIN
getnextline ("CBF", line);
parse;
IF (bad_word = cur_word) THEN
BEGIN
match := true;
correct_word := good_word;
END;
Search_CBF := match;
close ("CBF");
END; (Search_CBF)
PROCEDURE AddTo_CBF (bad_word, good_word : STRING);
BEGIN
open ("CBF"); (assume that open positions at end of file)
write (bad_word); write ("->"); writeln (good_word);
close ("CBF");
END;{AddTo_CBF}
PROCEDURE CorrectMisspelling
(ptr : ^CHAR,
cur_word: STRING,
correct_word : STRING);
VAR
to_ptr, from_ptr : ^CHAR;
BEGIN
IF (length(correct_word) < length(cur_word)) THEN
BEGIN
to_ptr := ptr + length(correct_word);
from_ptr := ptr + length(cur_word);
```

TABLE 1-continued

```
WHILE (from_ptr <= 1st_ptr) DO
BEGIN
to_ptr^:= from_ptr^;
to_ptr := to_ptr + 1; from_ptr := from_ptr + 1;
END;
END;
IF (length(correct_word) > length(cur_word)) THEN
BEGIN
to_ptr:= 1st_ptr +
(length(correct_word) - length(cur_word));
from_ptr := 1st_ptr;
WHILE (from_ptr >= ptr + length(cur_word)) DO
BEGIN
to_ptr^:= from_ptr^;
to_ptr := to_ptr - 1; from_ptr := from_ptr - 1
END;
END;
to_ptr := ptr;
FOR i := 1 TO length(correct_word) DO
BEGIN
to_ptr^:= correct_word[i]; to_ptr := to_ptr + 1;
END;
1st_ptr := 1st_ptr +
(length(correct_word) - length(cur_word))
END; {CorrectMisspelling}
BEGIN {Proof}
cur_ptr := frst_ptr;
WHILE (cur_ptr <= 1st_ptr)
BEGIN
FetchNextword(cur_ptr, cur_word);
nxt_ptr := cur_ptr + length(cur_word);
IF (NOT Verif(cur_word)) THEN
IF (Search_CBF(cur_word, correct_word)) THEN
BEGIN
CorrectMisspelling(cur_ptr, cur_word, correct_word);
nxt_ptr := cur_ptr + length(correct_word);
END;
ELSE
BEGIN
GetOption (option);
CASE option OF
.
.
.
"correct":
BEGIN
InputCorrection
(cur_word, correct_word,
save_flag);
If (save_f lag) THEN
AddTo_CBF(cur_word, correct_word);
CorrectMisspelling
(cur_ptr, cur_word,
correct_word);
nxt_ptr := cur_ptr + length(correct_word);
END;
.
.
.
ENDCASE;
END;
cur_ptr := nxt_ptr;
END;
END; {Proof}
```

Although the methods and systems of the present invention have been described in terms of preferred embodiments it is not intended that the invention be limited to these embodiments. Modifications within the spirit of the invention will be apparent to those skilled in the art. It will be apparent to those skilled in the art that the present invention can be used in other than word processing systems. The invention can be used generally in systems where spell checking is performed. The scope of the present invention is defined by the claims that follow.

I claim:

1. A method in a computer system for correcting the spelling of words in a plurality of documents, the computer system having a list of misspelled words and associated correctly spelled words, the method comprising:

for each of the plurality of documents,
for each word in the document,
determining whether the word is in the list as a misspelled word;
when the word is in the list as a misspelled word, automatically replacing the word with the associated correct spelling from the list
when the word is not correctly spelled and is not in the list as a misspelled word,
receiving from a user a correct spelling for the word; and
adding the misspelled word associated with the received correct spelling for the word to the list;

whereby once a misspelled word and received correct spelling is added to the list, the misspelled word is automatically replaced when it occurs in other documents.

2. The method of claim 1 including determining whether the word is correctly spelled by checking a dictionary.

3. The method of claim 1 wherein the adding of the misspelled word associated with the received correct spelling for the word to the list occurs only in response to a indication from the user to add the word to the list.

4. A method in a computer system for creating a list of misspelled words and associated correctly spelled words, the method comprising:

retrieving a word from a document;
determining whether the retrieved word is correctly spelled;
when the retrieved word is not correctly spelled,
receiving a correct spelling for the word; and
adding the retrieved word and its correct spelling to the list; and
for each other occurrence of the same retrieved word in the document, automatically replacing the occurrence with the received correct spelling.

5. The method of claim 4 including determining whether the retrieved word is in the list as a misspelled word; and
when the retrieved word is in the list as a misspelled word, replacing the retrieved word in the document with the associated correctly spelled word from the list.

6. The method of claim 5 wherein the receiving of the correct spelling for the word and the adding of the retrieved word and its correct spelling to the list occurs when the word is not in the list as a misspelled word.

7. The method of claim 4 including replacing the retrieved word with the received correct spelling.

8. A method in a computer system for creating a list of misspelled words and associated correctly spelled words, the method comprising:

retrieving a plurality of words from a document;
determining whether each of the plurality of retrieved words is correctly spelled; and
when a retrieved word is not correctly spelled,
receiving a correct spelling for the retrieved word; and
adding the retrieved word and its correct spelling to the list so that the retrieved word can automatically be corrected when retrieved from another document.

9. The method of claim 8 including determining whether the retrieved word is in the list as a misspelled word; and when the retrieved word is in the list as a misspelled word, replacing the retrieved word in the document with the associated correctly spelled word from the list.

10. The method of claim 9 wherein the receiving of the correct spelling for the word and the adding of the retrieved word and its correct spelling to the list occurs when the retrieved word is not in the list as a misspelled word.

11. The method of claim 8 including replacing the retrieved word with the received correct spelling.

12. A method in a computer system for correcting the spelling of words, the computer system having a list of misspelled words and associated correctly spelled words, the method comprising:

receiving a plurality of words;

storing each of the plurality of words in the document;

retrieving one of the words from the document;

determining whether the retrieved word is in the list as a misspelled word; and when the retrieved word is in the list as a misspelled word, replacing the retrieved word in the document with the correctly spelled word associated with the misspelled word.

13. The method of claim 12 including when the retrieved word is not in the list as a misspelled word, determining whether the retrieved word is correctly spelled; and when the retrieved word is not correctly spelled, receiving a correct spelling for the word; and adding the retrieved word and its correct spelling to the list so that the word can automatically be corrected when retrieved again.

14. A computer-readable medium containing instructions for causing a computer system to correct the spelling of words in a plurality of documents, the computer system having a list of misspelled words and associated correctly spelled words, by:

for each word in each of the plurality of documents, retrieving the word from the document;

determining whether the retrieved word is in the list as a misspelled word;

when the retrieved word is not correctly spelled and is not in the list as a misspelled word, receiving from a user a correct spelling for the retrieved word; and adding the misspelled word associated with the received correct spelling for the retrieved word to the list; and when the retrieved word is in the list as a misspelled word, replacing the retrieved word with the associated correct spelling from the list whereby once a misspelled word and received correct spelling is added to the list, the misspelled word is replaced when it is next retrieved.

15. The computer-readable medium of claim 14 wherein when the retrieved word is not in the list as a misspelled word, determining whether the received word is correctly spelled and receiving the correct spelling from the user only when the received word is not correctly spelled.

16. The computer-readable medium of claim 14 wherein the adding of the misspelled word associated with the received correct spelling for the misspelled word to the list occurs only in response to a indication from the user to add the retrieved word to the list.

17. A computer system for maintaining a corrected before file containing misspelled words and associated correctly spelled words, comprising:

a document having a plurality of words;

a list of correctly spelled words;

a find misspelled word unit to determine whether a word retrieved from the document is in the list of correctly spelled words; and a check corrected before file unit that, when the retrieved word is not in the list of correctly spelled words, receives a correct spelling for the word from a user, and adds the retrieved word and its correct spelling to the corrected before file.

18. The computer system of claim 17 further comprising:

a correct spelling unit that replaces the retrieved word of the document with the received correct spelling.

19. The computer system of claim 17 wherein the check corrected before file unit determines whether the retrieved word is in the corrected before file as a misspelled word before receiving the correct spelling for the word from the user.

20. The computer system of claim 19 wherein the check corrected before file unit automatically replaces the retrieved word with the associated correct spelling when it is determined that the retrieved word is in the corrected before file as a misspelled word.

* * * * *